United States Patent
Weng et al.

(10) Patent No.: US 11,073,938 B2
(45) Date of Patent: Jul. 27, 2021

(54) DISPLAY DEVICE

(71) Applicant: InnoLux Corporation, Chu-Nan (TW)

(72) Inventors: Tsan-Po Weng, Chu-Nan (TW); Li-Wei Sung, Chu-Nan (TW)

(73) Assignee: INNOLUX CORPORATION, Chu-Nan (TW)

(*) Notice: Subject to any disclaimer, the term of this patent is extended or adjusted under 35 U.S.C. 154(b) by 0 days.

(21) Appl. No.: 16/530,565

(22) Filed: Aug. 2, 2019

(65) Prior Publication Data

US 2020/0081602 A1 Mar. 12, 2020

(30) Foreign Application Priority Data

Sep. 7, 2018 (CN) .......................... 201811042880.3

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/0443* (2019.05); *G06F 3/0446* (2019.05); *G06F 3/0448* (2019.05)

(58) Field of Classification Search
None
See application file for complete search history.

(56) References Cited

U.S. PATENT DOCUMENTS

| | | | |
|---|---|---|---|
| 2014/0292679 A1* | 10/2014 | Kida | G06F 3/0445 345/173 |
| 2016/0202829 A1* | 7/2016 | Choi | G06F 3/04184 345/174 |
| 2017/0262099 A1* | 9/2017 | Nathan | G06F 3/04144 |
| 2018/0341356 A1* | 11/2018 | Wu | G06F 3/0443 |

* cited by examiner

*Primary Examiner* — Nicholas J Lee
(74) *Attorney, Agent, or Firm* — Muncy, Geissler, Olds & Lowe, P.C.

(57) ABSTRACT

A touch display device includes a substrate and a touch electrode array. The touch electrode array is disposed on the substrate, and includes a first touch electrode and a second touch electrode. The first touch electrode receives a first touch signal in a first time interval, and receives a second touch signal in a second time interval. The second touch electrode is adjacent to the first touch electrode in a first direction, and receives a third touch signal in the first time interval. A voltage polarity of the first touch signal is different from a voltage polarity of the second touch signal, and the voltage polarity of the first touch signal is different from a voltage polarity of the third touch signal.

18 Claims, 9 Drawing Sheets

| 210 | TX11 + | TX21 - | 220 |
|---|---|---|---|
| 230 | TX31 - | TX41 + | 240 |

| 210 | + | - | 220 |
|---|---|---|---|
| 230 | - | + | 240 |
| 250 | - | + | 260 |
| 270 | + | - | 280 |

DISPLAY DEVICE

CROSS REFERENCE TO RELATED APPLICATION

This application claims the benefits of the China Patent Application Serial Number 201811042880.3, filed on Sep. 7, 2018, the subject matter of which is incorporated herein by reference.

BACKGROUND

1. Technical Field

The present disclosure relates to the technical field of touch display, particularly to an in-cell touch display device and a driving method thereof.

2. Description of Related Art

Generally, there are "out-cell", "on-cell", and "in-cell" types of touch display devices. An in-cell touch display device may employ a mutual-capacitance sensing configuration, wherein a touch sensor and a display panel may share a common electrode layer operated in a time division mechanism.

However, some touch display devices may be installed in a vehicle. In a touch time interval, the touch signals transmitted from the touch display device may induce accumulated energy, and thus causes electromagnetic interference (EMI). The EMI having a frequency between 150 KHz to 1.8 MHz may be deemed violating the requirements set forth for vehicle EMI.

Therefore, it is desired to provide an improved touch display device to mitigate and/or obviate the problem of the EMI.

SUMMARY

The present disclosure provides a touch display device which includes a substrate and a touch electrode array. The touch electrode array is disposed on the substrate, and includes a first touch electrode and a second touch electrode. The first touch electrode receives a first touch signal in a first time interval, and receives a second touch signal in a second time interval. The second touch electrode is adjacent to the first touch electrode in a first direction, and receives a third touch signal in the first time interval. A voltage polarity of the first touch signal is different from a voltage polarity of the second touch signal; and the voltage polarity of the first touch signal is different from a voltage polarity of the third touch signal.

DETAILED DESCRIPTION OF THE EMBODIMENT

Different embodiments of the present disclosure are provided in the following description. These embodiments are not meant to be limiting. It is possible to modify, replace, combine, separate, or design the features in one embodiment of the present disclosure to realize other embodiments.

Figure 1A:
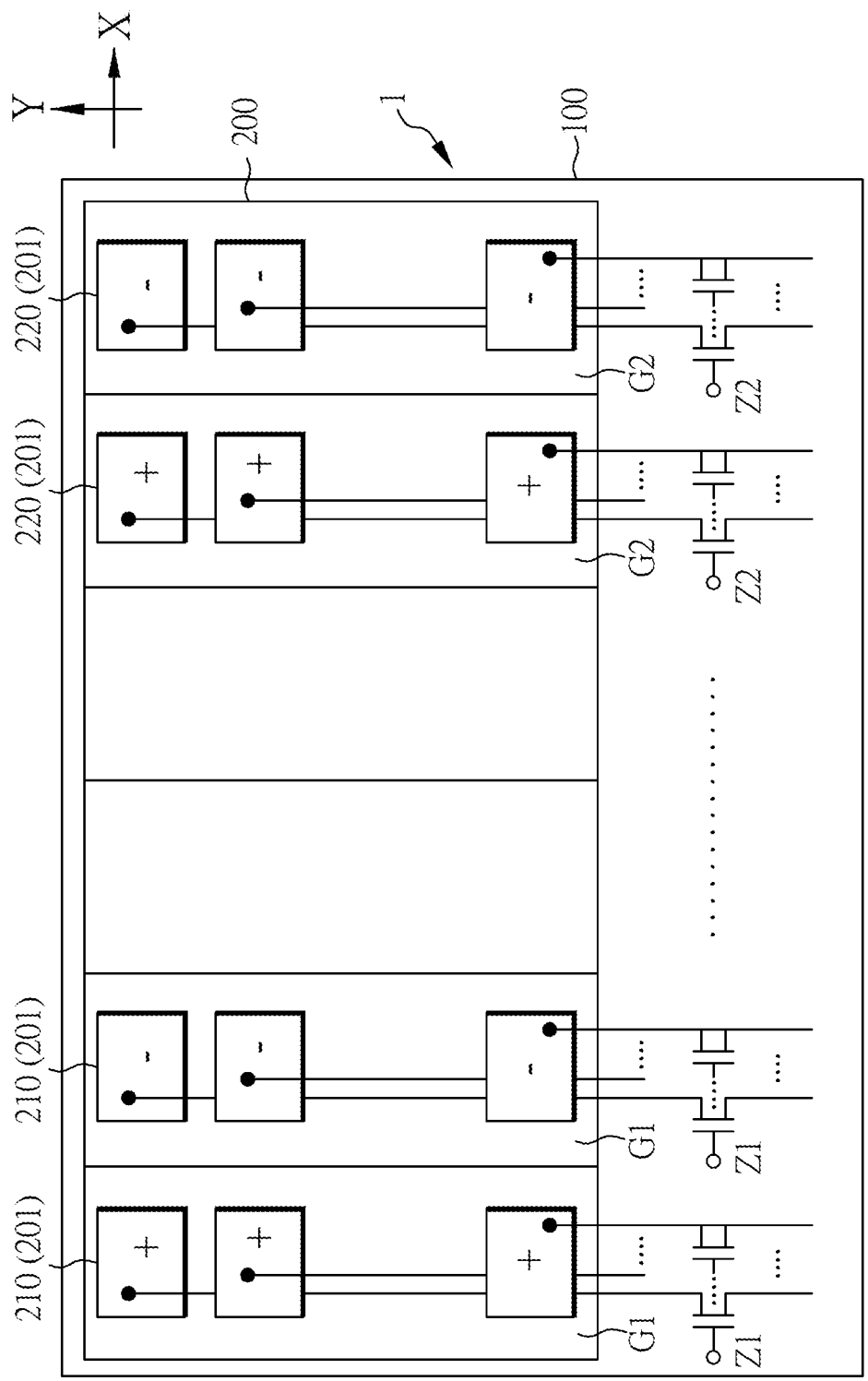
FIG. 1A shows a block diagram of the touch display device according to one embodiment of the present disclosure.

FIG. 1A shows a block diagram of the touch display device 1 according to one embodiment of the present disclosure.

As shown in FIG. 1A, the touch display device 1 includes a substrate 100 and a touch electrode array 200. The touch electrode array 200 is disposed on the substrate 100, and includes a first touch electrode 210 and a second touch electrode 220. In one embodiment, the touch display device 1 may be a liquid crystal touch display device, an organic light emitting diode (OLED) touch display device, a mini LED touch display device, a micro LED touch display device, a quantum-dot LED touch display device, or any combination of the aforementioned touch display devices. In another embodiment, the appearance of the touch display device 1 or the shape of the display region may be rectangle, square, round, oval, polygon, free shape, or any combination of the aforementioned shapes. The shape may be designed depending on a practical requirement.

Figure 2A:
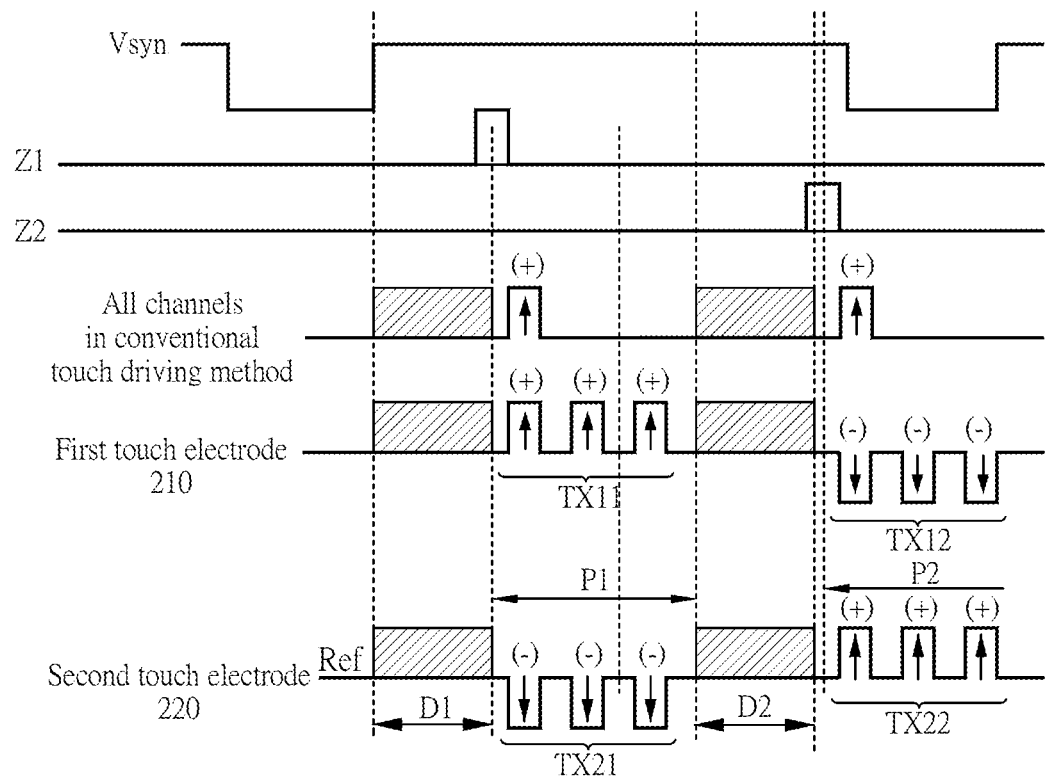
FIG. 2A shows a timing diagram of touch signal of the touch display device according to one embodiment of the present disclosure.

FIG. 2A shows a timing diagram of touch signal of the touch display device 1 according to one embodiment of the present disclosure.

Referring both to FIGS. 1A and 2A, the first touch electrode 210 receives a first touch signal TX11 in a first time interval P1, and receives a second touch signal TX12 in a second time interval P2. The second touch electrode 220 is adjacent to the first touch electrode 210 in a first direction X, receives a third touch signal TX21 in the first time interval P1, and receives a fourth touch signal TX22 in the second time interval P2. The voltage polarity of the first touch signal TX11 is different from the voltage polarity of the second touch signal TX12, and the voltage polarity of the first touch signal TX11 is different from the voltage polarity of the third touch signal TX21. In one embodiment, the voltage polarity of the fourth touch signal TX22 may be the same as the voltage polarity of the first touch signal TX11.

In another embodiment, the shape of the first touch electrode 210 or the second touch electrode 220 is not limited to be rectangle (as shown in FIG. 1A), and may be square, round, oval, polygon, free shape, or any combination of the aforementioned shapes. For example, when the substrate 100 has a round shape, the touch electrode located in the peripheral region of the touch electrode array 200 may be a free shape, while, the touch electrode located in the touch-sensing (e.g. center) region of the touch electrode array 200 may be a rectangular shape. The aforementioned design is an example, but not meant to be limiting. Other design may be implemented depending on a practical requirement.

In a further embodiment, the first time interval P1 is set between the first display time interval D1 and the second display time interval D2 of the touch display device 1, and the second time interval P2 is set between the second display time interval D2 and the third display time interval D3 (not shown) of the touch display device 1, but not limited thereto. In another embodiment, the first time interval P1 and the second time interval P2 may have different lengths or may have the same length. The ratio of the first time interval P1 to the first display time interval D1 or the ratio of the second time interval P2 to the first display time interval D1 may be greater than or equal to 20%, or smaller than or equal to 80%.

Voltage polarities includes a positive voltage polarity (hereinafter, "positive-polarity") and a negative voltage polarity (hereinafter, "negative-polarity"). In one embodiment, the positive-polarity may be defined when the voltage amplitude of a touch signal is greater than a reference voltage Ref, while, the negative-polarity may be defined when the voltage amplitude of a touch signal is smaller than a reference voltage Ref. In another embodiment, the voltage amplitude is the voltage difference between the maximum (highest) value or the minimum (lowest) value of the amplitude of the touch signal and a reference voltage Ref, wherein the reference voltage Ref may be a specified positive voltage, a specified negative voltage, or a ground voltage.

Optionally, as shown in FIG. 2A, each of the first touch signal TX11, the second touch signal TX12, the third touch signal TX21, and the fourth touch signal TX22 may include a plurality of touch pulses. Moreover, in the case of FIG. 2A, the plural touch pulses in each touch signal have the same voltage polarity. For example, the first touch signal TX11 includes three positive-polarity touch pulses, the second touch signal TX12 include three negative-polarity touch pulses, the third touch signal TX21 includes three negative-polarity touch pulses, the fourth touch signal TX22 includes three positive-polarity touch pulses, and so on.

In one embodiment, the three touch pulses of the first touch signal TX11 may have different voltage amplitudes, and the three touch pulses of the third touch signal TX21 may also have different voltage amplitudes. A condition is considered to meet with the requirement of the present disclosure, if each touch pulse of the first touch signal TX11 and its corresponding touch pulse of the third touch signal TX21 have opposite voltage polarities and the same absolute voltage amplitude in a specific time interval. For example, two absolute voltage amplitudes in a specific time interval is deemed to be substantially the same when the difference of the absolute voltage amplitude of each touch pulse of the first touch signal TX11 and its corresponding touch pulse of the third touch signal TX21 is smaller than or equal to 400 mV in the specific time interval.

In another embodiment, the three touch pulses of the first touch signal TX11 may have different pulse widths in the time axis, and the three touch pulses of the third touch signal TX21 may also have different pulse widths in the time axis. A condition is considered to meet with the requirement of the present disclosure, if each touch pulse of the first touch signal TX11 and its corresponding touch pulse of the third touch signal TX21 have opposite voltage polarities, and the involved pulses at least partially overlap each other. An "overlapping-pulse region" is deemed to exist when a touch pulse of the first touch signal TX11 overlaps its corresponding touch pulse of the third touch signal TX21 with their overlapping width greater than or equal to 50% of their own width within an time interval defined in the time axis. However, in other embodiments, the plural touch pulses in each touch signal may have different voltage polarities, and these embodiments will be discussed hereinafter.

Optionally, for the convenience of design, the touch pulses may have the same pulse width, but not limited thereto.

Optionally, the touch display device 1 is a self-capacitance touch display device, wherein each touch electrode 201 of the touch electrode array 200 receives a touch signal in a touch transmission time interval, and transmits a received touch signal in a touch reception time interval. The received touch signal is derived from the touch signal by the charge changing of a touching object.

Optionally, the touch electrode array 200 may include a plurality of first touch electrode groups G1 and a plurality of second touch electrode groups G2, and they may be arranged along the second direction Y, or arranged along a certain direction (not shown) slanted by a non-zero angle from the second direction Y. For the sake of explanation, the plural first touch electrode groups G1 and the plural second touch electrode groups G2 are arranged along the second direction Y in the embodiments of the present disclosure, but it is not meant to be limiting. The first touch electrode groups G1 are electrically connected to at least one first voltage-polarity switch Z1, and include a plurality of first touch electrodes 210. The voltage polarity of the plural first touch electrodes 210 is controlled by the at least one first voltage-polarity switch Z1. The second touch electrode groups G2 are electrically connected to at least one second voltage-polarity switch Z2, and include a plurality of second touch electrodes 220. The voltage polarity of the plural second touch electrodes 220 is controlled by the at least one second voltage-polarity switch Z2. This configuration realizes a dual partition control.

As shown in FIG. 2A, the control signal of the switch Z1 is substantially given and appears at the end of the first display time interval D1. For example, the falling edge of the first display time interval D1 may be aligned with the rising edge of the control signal of the switch Z1, or, it may be alternatively aligned with the center of the control signal of the switch Z1. After the control signal of the switch Z1 arrives, the touch electrodes 210 and 220 enter the first time interval P1 for touch sensing. Similarly, the control signal of the switch Z2 is substantially given and appears at the end of the second display time interval D2. For example, the falling edge of the second display time interval D2 may be aligned with the rising edge of the control signal of the switch Z2, or, it may be alternatively aligned with the center of the control signal of the switch Z2. After the control signal of the switch Z2 arrives, the touch electrodes 210 and 220 enter the second time interval P2 for touch sensing.

Figure 1B:
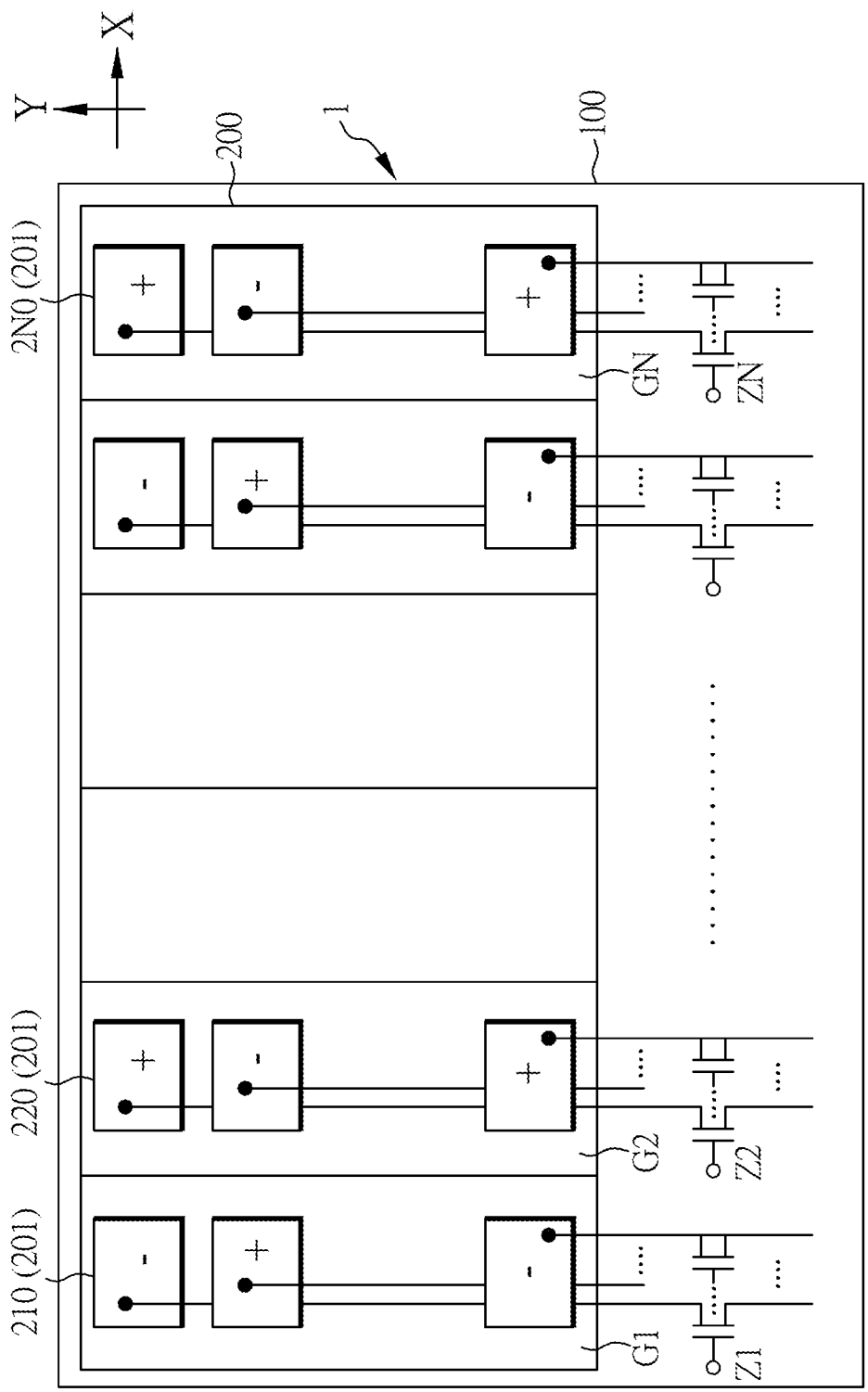
FIG. 1B shows a block diagram of the touch display device according to another embodiment of the present disclosure.

FIG. 1B shows a block diagram of the touch display device 1 according to another embodiment of the present disclosure.

In this embodiment, the touch electrode array 200 includes a plurality of touch electrode groups G1, G2, . . . , GN, and they may be arranged along the second direction Y. For example, the first touch electrode group G1 is electrically connected to at least one first voltage-polarity switch Z1, and includes a plurality of first touch electrodes 210. The voltage polarity of the plural first touch electrodes 210 is controlled by the at least one first voltage-polarity switch Z1. The second touch electrode group G2 is electrically connected to at least one second voltage-polarity switch Z2, and includes a plurality of second touch electrodes 220. The voltage polarity of the plural second touch electrodes 220 is controlled by the at least one second voltage-polarity switch Z2, and so on. Finally, the N-th touch electrode group GN is electrically connected to at least one N-th voltage-polarity switch ZN, and includes a plurality of N-th touch electrodes 2N0. The voltage-polarity of the plural N-th touch electrodes 2N0 is controlled by the at least one N-th voltage-polarity switch ZN. This configuration realizes a multi-partition control. In a further embodiment, the description "the voltage polarity of the plural first touch electrodes 210 is controlled by the at least one first voltage-polarity switch Z1" means that, for example, the voltage polarity of all first touch electrodes 210 is controlled by a first voltage-polarity switch Z1, or, the voltage polarity of each first touch electrode 210 is controlled by its corresponding first voltage-polarity switch Z1, or, the voltage polarity of a first touch electrode 210 is controlled by two or more first voltage-polarity switches Z1, and not limited thereto. The aforementioned correspondences between the electrode and the switch are also applicable to the second touch electrode 220 or any other touch electrode.

Figure 2B:
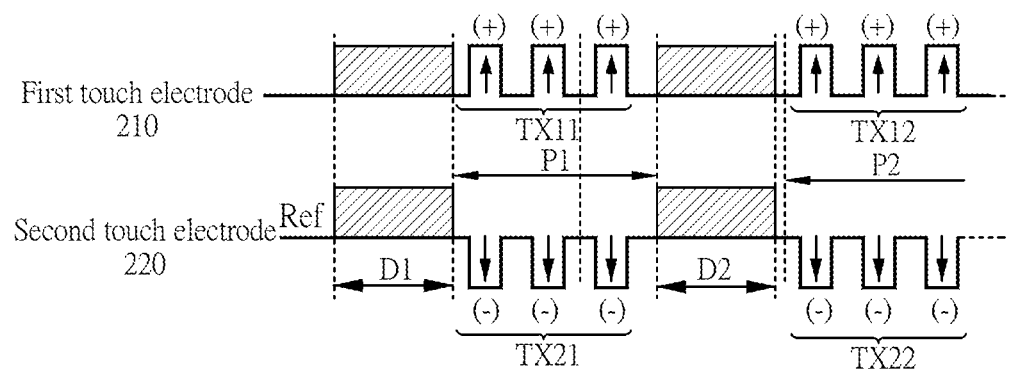
FIG. 2B shows a timing diagram of touch signal of the touch display device according to another embodiment of the present disclosure.

FIG. 2B shows a timing diagram of touch signal of the touch display device 1 according to another embodiment of the present disclosure.

As shown in FIG. 2B, the voltage polarity of the first touch signal TX11 is the same as the voltage polarity of the second touch signal TX12, and the voltage polarity of the first touch signal TX11 is different from the voltage polarity of the third touch signal TX21.

As shown in FIGS. 2A and 2B, the conventional touch driving method only allows all channels (i.e., all touch electrode channels corresponding to the plural touch electrode groups G1, G2, . . . , GN) to transmit a single positive-polarity touch pulse or a single negative-polarity touch pulse (not shown). According to the present disclosure, it is possible to use a multi-pulse channel to output a plurality of positive-polarity touch pulses or a plurality of negative-polarity touch pulses.

Figure 3A:
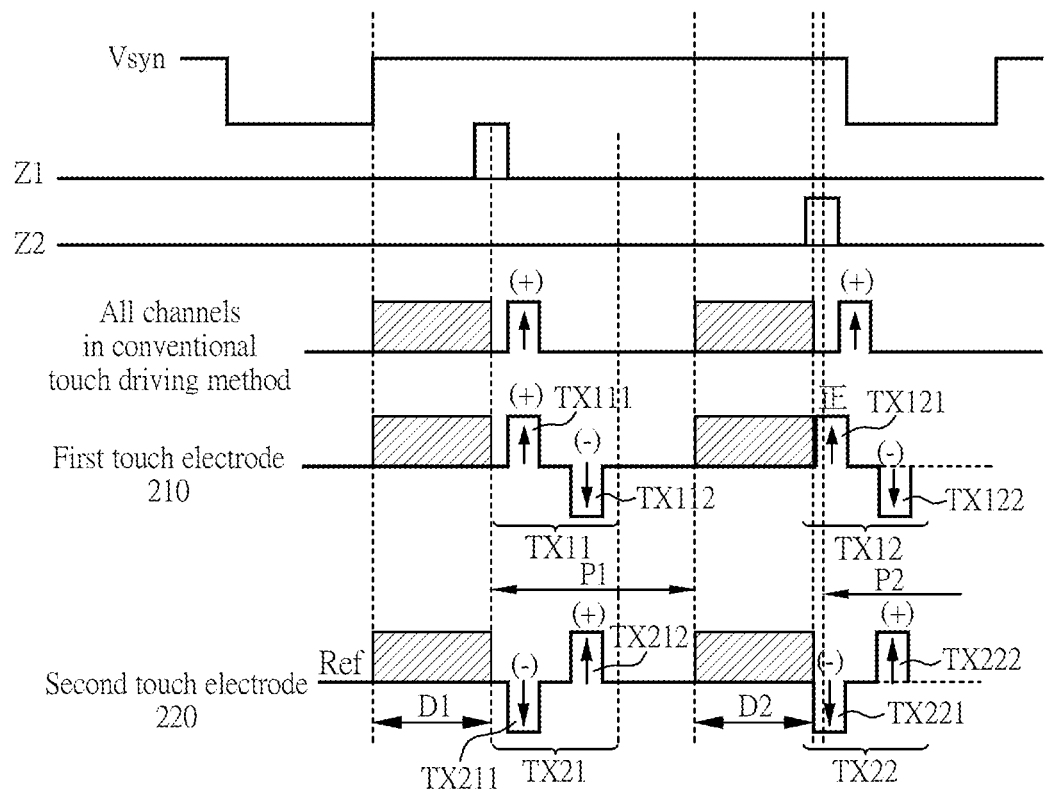
FIG. 3A shows a timing diagram of touch signal of the touch display device according to one embodiment of the present disclosure, wherein, in each touch signal, the touch pulses have different voltage polarities.

FIG. 3A shows a timing diagram of touch signal of the touch display device 1 according to one embodiment of the present disclosure, wherein the plural touch pulses in each touch signal have different voltage polarities.

Referring both to FIGS. 1A and 3A, the first touch signal TX11 of the first touch electrode 210 further includes a first touch pulse TX111 and a second touch pulse TX112, and the voltage polarity of the first touch pulse TX111 is different from the voltage polarity of the second touch pulse TX112. However, the first touch signal TX11 and the second touch signal TX12 have the same touch pulse form. For example, for the touch pulses TX111 and TX112, one is positive and the other is negative, and correspondingly, for the touch pulses TX121 and TX122, one is positive and the other is negative as well, but not limited thereto. In other embodiments, the first touch signal TX11 and the second touch signal TX12 may have different touch pulse forms, for example, have different numbers of pulses, or their respective pulses have different voltage polarities, voltage amplitudes, pulse widths, pulse shapes, and so on.

Similarly, the third touch signal TX21 of the second touch electrode 220 further includes a third touch pulse TX211 and a fourth touch pulse TX212, and the voltage polarity of the third touch pulse TX211 is different from the voltage polarity of the fourth touch pulse TX212. However, the third touch signal TX21 and the fourth touch signal TX22 have the same touch pulse form. For example, for the touch pulses TX211 and TX212, one is negative and the other is positive, and correspondingly, for the touch pulses TX221 and TX222, one is negative and the other is positive as well, but not limited thereto. In other embodiments, the third touch signal TX21 and the fourth touch signal TX22 may have different touch pulse forms, for example, have different numbers of pulses, or their respective pulses have different voltage polarities, voltage amplitudes, pulse widths, pulse shapes, and so on.

Figure 3B:
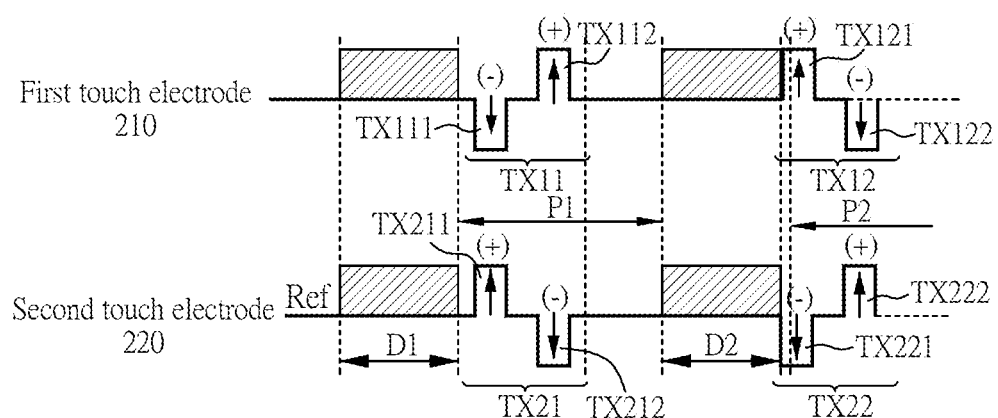
FIG. 3B shows a timing diagram of touch signal of the touch display device according to another embodiment of the present disclosure, wherein, in each touch signal, the touch pulses have different voltage polarities.

FIG. 3B shows a timing diagram of touch signal of the touch display device 1 according to another embodiment of the present disclosure, wherein, the plural touch pulses in each touch signal have different voltage polarities.

As shown in FIG. 3B, the voltage polarity of the first touch pulse TX111 is different from the voltage polarity of the second touch pulse TX112. However, the first touch signal TX11 and the second touch signal TX12 have different touch pulse forms. For example, for the touch pulses TX111 and TX112, one is positive and the other is negative, and for the touch pulses TX121 and TX122, one is negative and the other is positive, but not limited thereto.

Similarly, the voltage polarity of the third touch pulse TX211 is different from the voltage polarity of the fourth touch pulse TX212. However, the third touch signal TX21 and the fourth touch signal TX22 have different touch pulse forms. For example, for the touch pulses TX211 and TX212, one is negative and the other is positive, and for the touch pulses TX221 and TX222, one is positive and the other is negative, but not limited thereto.

Figures 4A, 4B:
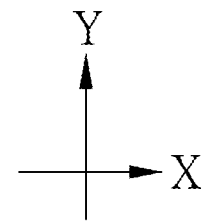
FIG. 4A shows a spatial distribution diagram of the voltage polarities of the touch electrodes according to one embodiment of the present disclosure.
FIG. 4B shows a spatial distribution diagram of the voltage polarities of the touch electrodes according to another embodiment of the present disclosure.

FIG. 4A shows a spatial distribution diagram of the voltage polarities of the touch electrodes according to one embodiment of the present disclosure.

As shown in FIG. 4A, the touch electrode array 200 of the touch display device 1 further includes a third touch electrode 230 adjacent to the first touch electrode 210 in a second direction Y, wherein the second direction Y is different from the first direction X. The description "one direction is different from another direction" may be explained as the two directions are perpendicular to each other, the two directions intersect with each other, or the two directions have a non-zero angle between them. The third touch electrode 230 receives a fifth touch signal TX31 in the first time interval P1, and receives a sixth touch signal TX32 in the second time interval P2. (FIG. 4A only shows the situation in the first time interval P1. The sixth touch signal TX32 appearing in the second time interval P2 is not shown.) The voltage polarity of the first touch signal TX11 is different from the voltage polarity of the fifth touch signal TX31.

Herein, the voltage polarities in the first time interval P1 are shown for the first touch signal TX11 of the first touch electrode 210, the third touch signal TX21 of the second touch electrode 220, and the fifth touch signal TX31 of the third touch electrode 230.

Furthermore, as shown in FIG. 4A, the touch electrode array 200 of the touch display device 1 further includes a fourth touch electrode 240 adjacent to the second touch electrode 220 in the second direction Y, and adjacent to third touch electrode 230 in the first direction X. The fourth touch electrode 240 receives a seventh touch signal TX41 in the first time interval P1, and receives an eighth touch signal TX42 in the second time interval P2. (FIG. 4B only shows the situation in the first time interval P1. The eighth touch signal TX42 appearing in the second time interval P2 is not shown.) The voltage polarity of the first touch signal TX11 is the same as the voltage polarity of the seventh touch signal TX41.

Herein, the voltage polarities in the first time interval P1 are shown for the first touch signal TX11 of the first touch electrode 210, the third touch signal TX21 of the second touch electrode 220, the fifth touch signal TX31 of the third touch electrode 230, and the seventh touch signal TX41 of the fourth touch electrode 240.

FIG. 4B shows a spatial distribution diagram of the voltage polarities of the touch electrodes according to another embodiment of the present disclosure.

As shown in FIG. 4B, in addition to the existed touch electrodes 210, 220, 230, and 240 in FIG. 3A, the touch electrode array 200 of the touch display device 1 further includes touch electrodes 250, 260, 270, and 280. For example, in the first time interval P1, the touch electrodes 210, 220, 230, and 240 have positive, negative, negative, and positive voltage polarities, respectively, and the touch electrodes 250, 260, 270, and 280 have negative, positive, positive, and negative voltage polarities, respectively. As a result, there are two adjacent negative-polarity touch electrodes 230 and 250, and there are two adjacent positive-polarity touch electrodes 240 and 260. However, it is still possible to find an at-least-partially-overlapping-pulse region among the voltage polarities of the eight touch electrodes in the first time interval P1, and they can still cancel each other out when summed up (as the intensity integral of the signals). Herein, the voltage polarities of the touch electrodes are illustratively shown, but not meant to be limiting. Moreover, the four touch electrodes in FIG. 3A and the eight touch electrodes in FIG. 3B are illustratively shown, but not meant to be limiting. The number of touch electrodes may be designed in a practical application as long as the voltage polarities of the touch electrodes can cancel each other out.

As illustrated in the timing diagrams of FIGS. 2A, 2B, 3A, and 3B, or the distribution diagrams of the voltage polarities of FIGS. 4A and 4B, the voltage polarities of the plural touch signals may cancel each other out in either the first time interval P1 or the second time interval P2. In the example of FIG. 2A, in the first time interval P1, the whole first touch signal TX11 (or its plural pulses) at least partially overlaps the whole third touch signal TX21 (or its plural pulses), and an at-least-partially-overlapping-pulse region is found; and in the second time interval P2, the whole second touch signal TX12 (or its plural pulses) at least partially overlaps the whole fourth touch signal TX22 (or its plural pulses), and an at-least-partially-overlapping-pulse region is found, but not limited thereto. The positions of the touch signals in the first time interval P1 or the second time interval P2 are designed so that the voltage polarities of the touch signals can cancel each other out, thereby mitigating the EMI. In general, the touch electrode array 200 includes a plurality of touch electrodes, and each touch electrode carries at least one touch signal. The voltage polarities of the plural touch signals cancel each other out when summed up (as the intensity integral of the signals) in a specific time interval. The concept of the specific time interval is not only applicable to the first time interval P1 or the second time interval P2, but also applicable to the third time interval P3 or other time intervals P4, P5, P6 (not shown), and so on.

Figure 5:
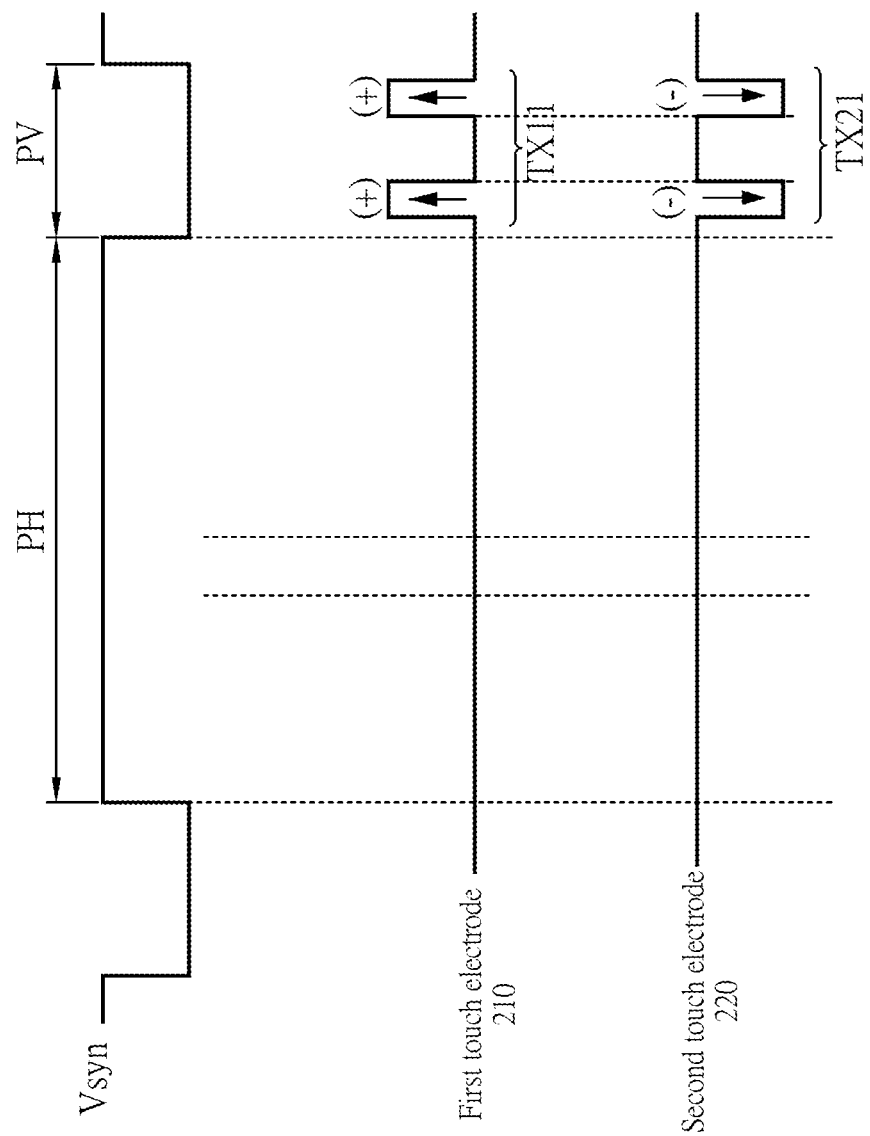
FIG. 5 shows a timing diagram of touch signal of the touch display device according to one embodiment of the present disclosure, wherein the touch signal appears in a vertical blanking interval.

FIG. 5 shows a timing diagram of touch signal of the touch display device 1 according to one embodiment of the present disclosure, wherein the touch signal is given and appears in a vertical blanking interval PV.

According to the specification of the display device, when the vertical sync signal Vsyn is low, the display signals, such as the red signal (R), the green signal (G), and the blue signal (B) will disappear. Therefore, the low voltage interval of the vertical sync signal is defined to be the vertical blanking interval (VBI), and the high voltage interval of the vertical sync signal is defined to be the horizontal blanking interval (HBI).

Figure 6A:
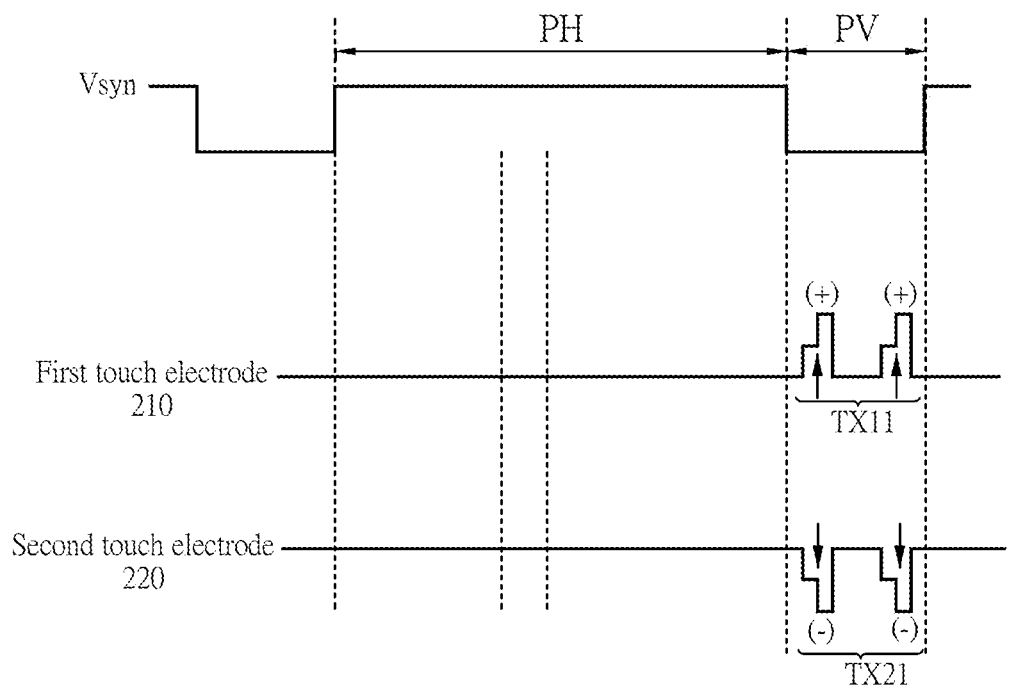
FIGS. 6A and 6B show timing diagrams of touch signal of the touch display device according to one embodiment of the present disclosure, wherein the touch signal appears in a vertical blanking interval.
Figure 6B:
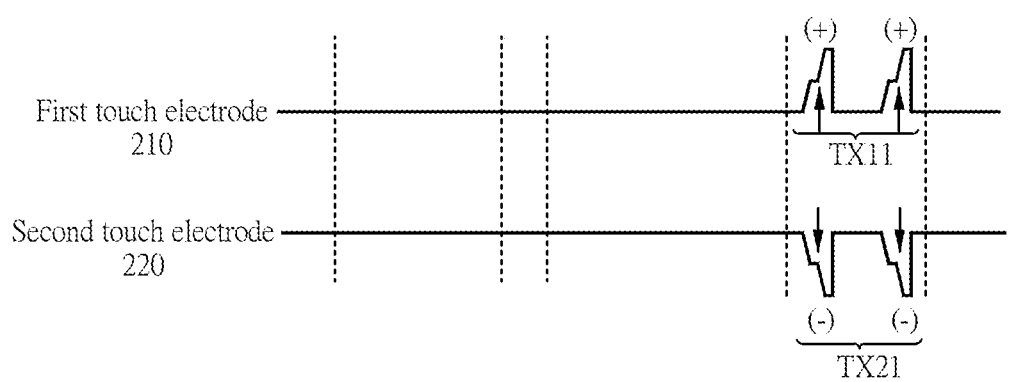

In FIGS. 2A, 2B, 3A, and 3B, the first touch signal TX11 and the third touch signal TX21 are transmitted in the horizontal blanking interval PH. In FIGS. 5, 6A and 6B (which will be discussed later), the first touch signal TX11 and the third touch signal TX21 are transmitted in the vertical blanking interval PV. It then shows that a touch signal may be transmitted in either the horizontal blanking interval PH or the vertical blanking interval PV.

FIGS. 6A and 6B show timing diagrams of touch signal of the touch display device 1 according to one embodiment of the present disclosure, wherein the touch signal is given and appears in a vertical blanking interval PV.

As shown in FIGS. 6A and 6B, each touch signal has a gradually changing waveform. The gradually changing waveform in FIG. 6A is a stepped pulse waveform, and the gradually changing waveform in FIG. 6B is a ramping stepped pulse waveform. The gradually changing waveform in FIGS. 6A and 6B are examples, and not meant to be limiting. A touch signal having a gradually changing waveform can avoid occurrence of overdamping. Moreover, a touch signal having a gradually changing waveform is also applicable to the embodiments of FIGS. 2A, 2B, 3A, and 3B, wherein the touch pulse is transmitted in the horizontal blanking interval.

Figure 7:
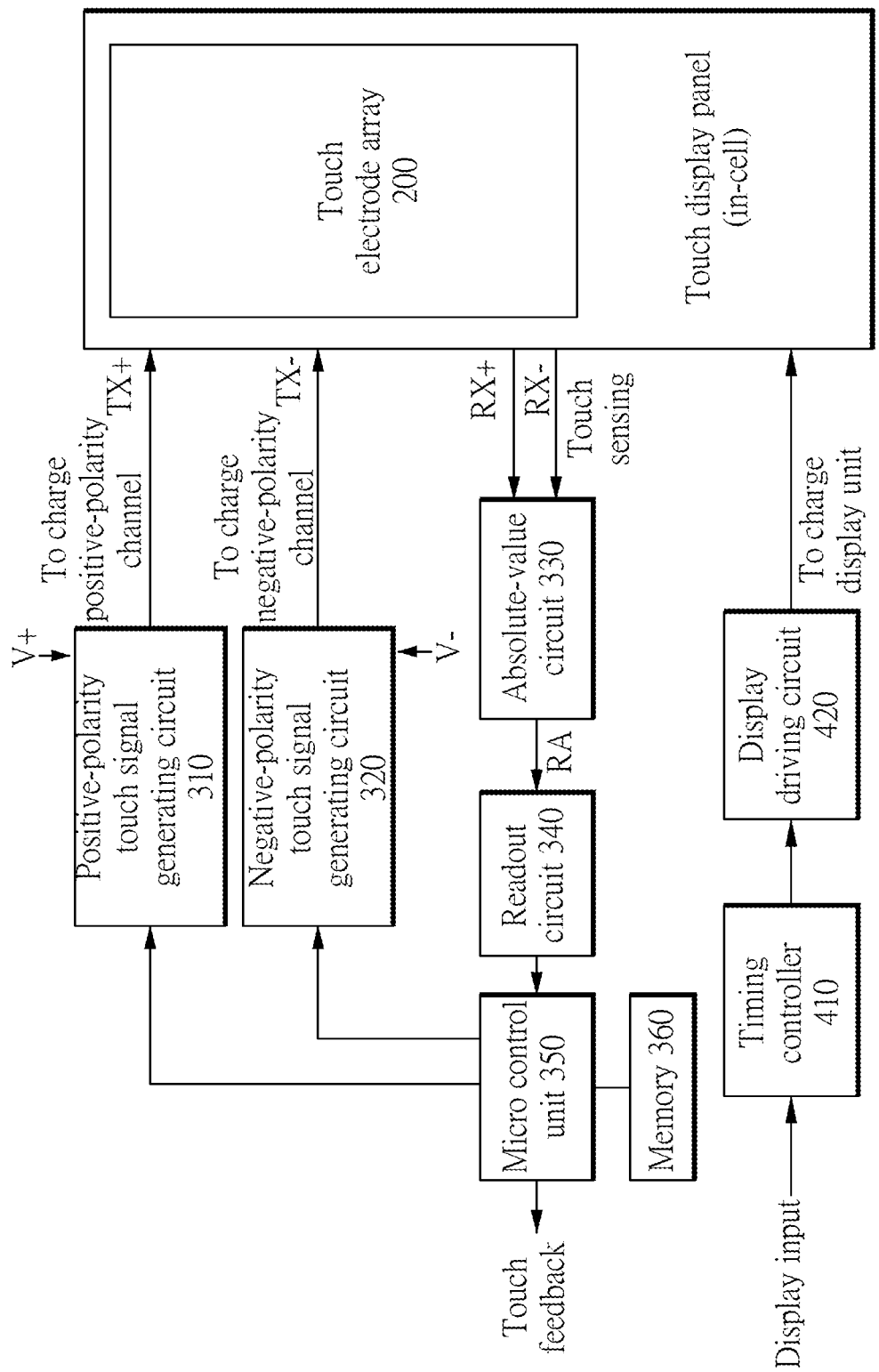
FIG. 7 shows an overall block diagram of the touch display device according to one embodiment of the present disclosure.

FIG. 7 shows an overall block diagram of the touch display device 1 according to one embodiment of the present disclosure.

As shown in 7, in addition to the touch electrode array 200, the touch display device 1 further includes a positive-polarity touch signal generating circuit 310, a negative-polarity touch signal generating circuit 320, and an absolute-value circuit 330.

The positive-polarity touch signal generating circuit 310 provides at least one positive-polarity touch signal TX+, the negative-polarity touch signal generating circuit 320 provides at least one negative-polarity touch signal TX−, and they are electrically connected to at least two touch electrodes 201 of the touch electrode array 200. For example, the positive-polarity touch signal generating circuit 310 is electrically connected to the first touch electrode 210, and the negative-polarity touch signal generating circuit 320 is electrically connected to the second touch electrode 220 (as shown in FIG. 1), but not limited thereto.

The absolute-value circuit 330 is electrically connected to the touch electrode array 200. For example, the absolute-value circuit 330 is used to derive the absolute value of a received positive-polarity touch signal RX+ read from the first touch electrode 210 or the absolute value of a received negative-polarity signal RX- read from the second touch electrode 220, and thus generates an absolute-value signal RA.

Furthermore, the touch display device 1 may further include a readout circuit 340, a micro control unit 350, a memory 360, a timing controller 410, and a display driving circuit 420.

The absolute-value signal RA is sent to the readout circuit 340, and is then sent to the micro control unit 350. The micro control unit 350 accordingly generates a touch feedback, for example, to report the touch position or the touch pressure, but not limited thereto. The micro control unit 350 may store the touch data in the memory 360. The micro control unit 350 may be used to control the positive-polarity touch signal generating circuit 310 and the negative-polarity touch signal generating circuit 320, thereby determining a certain polarity to be sent to a certain touch electrode 201 in a certain time. The determination may be achieved by, for example, a plurality of switches, such as transistors.

Figure 8:
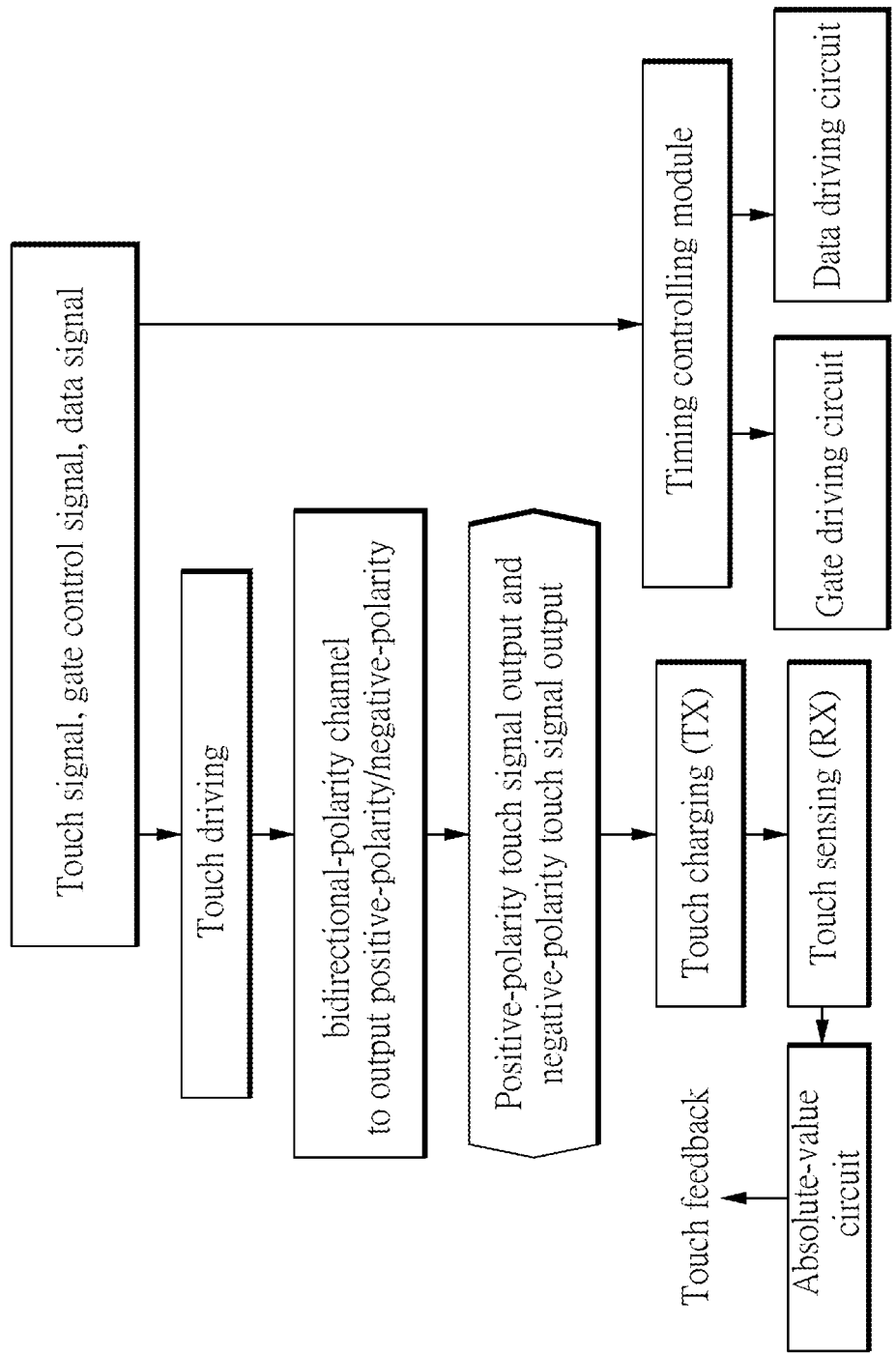
FIG. 8 shows a flowchart of the touch display device according to one embodiment of the present disclosure.

FIG. 8 shows a flowchart of touch display device 1 according to one embodiment of the present disclosure.

A controller (not shown) of the display device generates a touch signal, a gate control signal, and a data signal, to trigger a touch driving mechanism and a display driving mechanism.

In the touch driving mechanism, the positive-polarity touch signal generating circuit 310 and the negative-polarity touch signal generating circuit 320 (as shown in FIG. 7) may have a bidirectional-polarity channel (bidirectional polarity including positive polarity and negative polarity), to respectively generate a positive-polarity touch signal output and a negative-polarity touch signal output, so as to charge the touch electrode 201 (as shown in FIG. 1), which thus carries a touch signal TX. Next, the touch signal TX is changed into a received touch signal RX by the charge of a touching object. The received touch signal RX is sent to the absolute-value circuit 330. The absolute-value circuit 330 is used to derive the absolute value of the received touch signal RX, which may be used to generate a touch feedback in the subsequent circuit.

In the display driving mechanism, the gate control signal and the data signal are sent to a timing controlling module, such as a timing controller IC (Tcon IC). The timing controlling module respectively outputs a gate control signal to a gate driving circuit (gate driver IC), and outputs a data signal to a data driving circuit (data driver IC), thereby controlling the on/off state or the grayscale of at least one sub-pixel of the touch display panel. The detailed description of the display driving mechanism is deemed unnecessary and thus omitted here.

When ordinals, such as "first", "second", and so on, are used to describe components in the present disclosure and claims, it does not mean that a smaller ordinal essentially exists before a greater ordinal. The ordinals are used to distinguish two components which have the same name. Unless otherwise explained, the ordinals are not used to describe the arrangement order or the manufacture order of two components.

Moreover, the descriptions, such as "disposed on", "arranged on", and so on, are used to describe relative locations of two components, and it does not mean that the two components essentially contact with each other, unless otherwise explained. Similarly, the terms "connection", "electrical connection", and so on, may refer both to direct connection and indirect connection, unless otherwise explained.

Although the present disclosure has been explained in relation to its embodiments, it is to be understood that many other possible modifications and variations can be made without departing from the spirit and scope of the disclosure as hereinafter claimed.

What is claimed is:

1. A touch display device, comprising:
a substrate;
a touch electrode array disposed on the substrate and including:
a first touch electrode configured to receive a first touch signal in a first time interval, and receive a second touch signal in a second time interval;
a second touch electrode adjacent to the first touch electrode in a first direction, and configured to receive a third touch signal in the first time interval;
a positive-polarity touch signal generating circuit electrically connected at least to the first touch electrode; and
a negative-polarity touch signal generating circuit electrically connected at least to the second touch electrode,
wherein a voltage polarity of the first touch signal is different from a voltage polarity of the second touch signal, and the voltage polarity of the first touch signal is different from a voltage polarity of the third touch signal;
wherein each of the positive-polarity touch signal generating circuit and the negative-polarity touch signal generating circuit has a bidirectional-polarity channel.

2. The touch display device of claim 1, wherein the second touch electrode is configured to receive a fourth touch signal in the second time interval, and a voltage polarity of the fourth touch signal is the same as the voltage polarity of the first touch signal.

3. The touch display device of claim 1, further comprising:
a third touch electrode adjacent to the first touch electrode in a second direction, the second direction being different from the first direction, the third touch electrode being configured to receive a fifth touch signal in the first time interval;
wherein the voltage polarity of the first touch signal is different from a voltage polarity of the fifth touch signal.

4. The touch display device of claim 3, further comprising:
a fourth touch electrode adjacent to the second touch electrode in the second direction, and adjacent to the third touch electrode in the first direction, and configured to receive a seventh touch signal in the first time interval;
wherein the voltage polarity of the first touch signal is the same as a voltage polarity of the seventh touch signal.

5. The touch display device of claim 1, wherein the first touch signal further includes a first touch pulse and a second touch pulse, and a voltage polarity of the first touch pulse is different from a voltage polarity of the second touch pulse.

6. The touch display device of claim 5, wherein the first touch pulse and the second touch pulse have the same pulse width.

7. The touch display device of claim 1, wherein the third touch signal further includes a third touch pulse and a fourth touch pulse, and a voltage polarity of the third touch pulse is different from a voltage polarity of the fourth touch pulse.

8. The touch display device of claim 1, wherein each of the first touch signal, the second touch signal, and the third touch signal has a gradually changing waveform.

9. The touch display device of claim 8, wherein the gradually changing waveform is a stepped pulse waveform or a ramping stepped pulse waveform.

10. The touch display device of claim 1, further comprising:
an absolute-value circuit electrically connected at least to the first touch electrode and the second touch electrode, and configured to derive an absolute value of a received positive-polarity touch signal read from the first touch electrode or an absolute value of a received negative-polarity touch signal read from the second touch electrode.

11. The touch display device of claim 1, wherein the touch electrode array includes:
a first touch electrode group arranged along a second direction, electrically connected to at least one first voltage-polarity switch, and including a plurality of the first touch electrodes, the voltage polarity of the plural first touch electrodes being controlled by the at least one first voltage-polarity switch; and
a second touch electrode group arranged along a second direction, electrically connected to at least one second voltage-polarity switch, and including a plurality of the second touch electrode, the voltage polarity of the plural second touch electrodes being controlled by the at least one second voltage-polarity switch.

12. The touch display device of claim 11, wherein the voltage polarity of all first touch electrodes is controlled by a first voltage-polarity switch, or, the voltage polarity of each first touch electrode is controlled by its corresponding first voltage-polarity switch, or, the voltage polarity of a first touch electrode is controlled by two or more first voltage-polarity switches.

13. The touch display device of claim 1, wherein the touch display device is configured to realize a dual partition control or a multi-partition control.

14. The touch display device of claim 1, wherein the first touch signal and the third touch signal are transmitted in a horizontal blanking interval or a vertical blanking interval.

15. The touch display device of claim 1, wherein the first time interval is set between a first display time interval and a second display time interval.

16. The touch display device of claim 15, wherein a ratio of the first time interval to the first display time interval is greater than or equal to 20%, or smaller than or equal to 80%.

17. The touch display device of claim 1, wherein the touch display device is a self-capacitance touch display device.

18. The touch display device of claim 1, wherein there are two adjacent negative-polarity touch electrodes or two adjacent positive-polarity touch electrodes.

* * * * *